No. 756,971. PATENTED APR. 12, 1904.
J. H. LEIGHTON.
GLASS FACED BRICK OR BUILDING BLOCK.
APPLICATION FILED MAY 25, 1903.
NO MODEL.
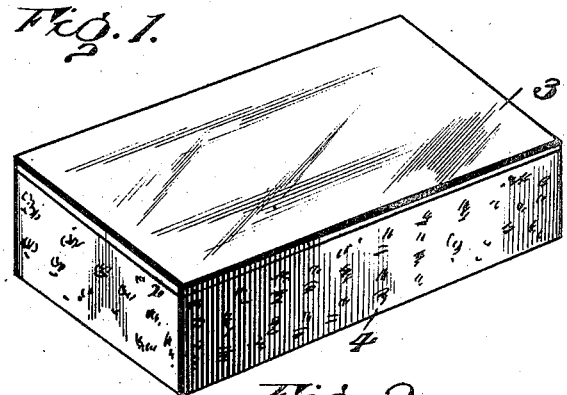
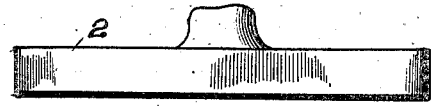
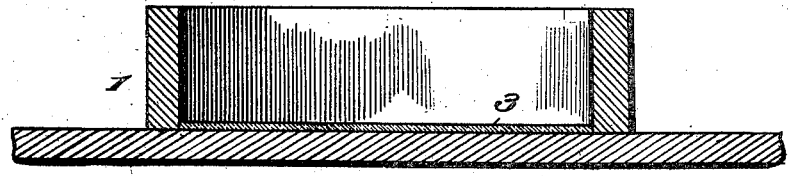
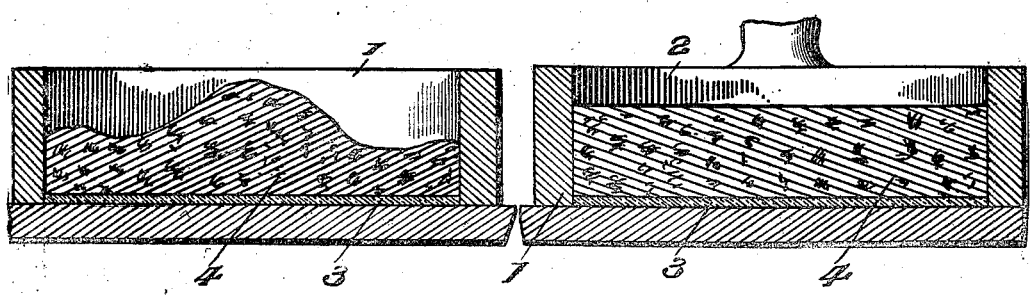
WITNESSES
INVENTOR.
J. H. Leighton.

No. 756,971. Patented April 12, 1904.

UNITED STATES PATENT OFFICE.

JAMES HARVEY LEIGHTON, OF AKRON, OHIO, ASSIGNOR OF ONE-HALF TO HILON S. SUMNER, OF AKRON, OHIO.

GLASS-FACED BRICK OR BUILDING-BLOCK.

SPECIFICATION forming part of Letters Patent No. 756,971, dated April 12, 1904.

Application filed May 25, 1903. Serial No. 158,699. (No model.)

*To all whom it may concern:*

Be it known that I, JAMES HARVEY LEIGHTON, a citizen of the United States, residing at Akron, in the county of Summit and State of Ohio, have invented certain new and useful Improvements in Glass-Faced Bricks or Building-Blocks, of which the following is a specification.

This invention provides a glass-faced brick or building-block of peculiar formation and involving novel process in its manufacture.

The body of the building unit is porous and its sides rough, so as to make a firm bond with the mortar, cement, or other binder and the face smooth, impervious, and lustrous.

In the manufacture of the article the body and face are separately formed and welded or fused, so as to make, in effect, a unitary structure. The body is composed of material capable of being softened by heat, so as to unite with the face by a welding action when both are rendered plastic or softened by heat and pressed together. The face may be glass, porcelain, or like vitreous substance and is comparatively thin, so as to form a substantial facing to the brick or block. The body is composed of sand, spar, alkali, and some metallic oxids, mixed and heated to about 2,000° to 2,500° Fahrenheit, whereby a vitreous spongy mass is formed. This mass while still plastic is given the required shape and welded to the glass facing, which has likewise been softened by heat.

In practicing the invention the instrumentalities shown in the accompanying drawings have been devised. However, other well-known means may be employed with equal advantage.

In the drawings, Figure 1 is a perspective view of a building brick or block embodying the invention. Fig. 2 is a sectional detail of the means for forming the block, the same illustrating the first step in the process of manufacture. Fig. 3 is a view similar to Fig. 2, showing a lump or mass of material forming the body of the brick or block placed in position for shaping and welding to the facing. Fig. 4 is a view similar to Figs. 2 and 3, showing the completion of the operation.

Corresponding and like parts are referred to in the following description and indicated in all the views of the drawings by the same reference characters.

The brick or building-block is shaped in a mold 1, which may be of any form, size, and construction. Plunger 2 is arranged to operate in the mold for compressing the material and causing same to conform to the shape of the mold as well as enabling the requisite force for effecting welding of the body and facing being conveniently and effectively applied. The facing 3 is of glass, porcelain, or like vitreous material, and consists of comparatively thin plate. This facing is softened by the application of heat and is forced into the bottom of the mold by plunger 2, as indicated in Fig. 2.

The material forming the body of the brick or building-block in a softened or plastic state and in sufficient quantity is placed upon the mold, as indicated in Fig. 3, and is forced into the same by descent of plunger 2, whereby the predetermined shape is imparted thereto and the body 4 welded to the facing 3, as indicated most clearly in Fig. 4. Within the purview of the invention the body 4 may be shaped in any manner and facing 3 applied and welded thereto by a fused joint. The facing 3 may be of any color and finish to present the desired effect. The body 4 is porous and its sides rough, so as to insure a firm union of the cement or mortar thereto.

Having thus described the invention, what is claimed as new is—

A building unit composed of a facing of glass or like material and a vitreous body having a spongy or porous nature welded to said facing by a fused joint, said body comprising sand, spar, alkali and a metallic oxid mixed and heated to about 2,000° to 2,500° Fahrenheit, substantially as specified.

In testimony whereof I affix my signature in presence of two witnesses.

JAMES HARVEY LEIGHTON. [L. S.]

Witnesses:
JOHN MOTZ,
L. N. MYERS.